(12) United States Patent
Liang et al.

(10) Patent No.: US 12,341,189 B2
(45) Date of Patent: Jun. 24, 2025

(54) LITHIUM-ION RECHARGEABLE BATTERY NEGATIVE ELECTRODE ACTIVE MATERIAL AND PREPARATION METHOD THEREOF, LITHIUM-ION RECHARGEABLE BATTERY NEGATIVE ELECTRODE PLATE, AND LITHIUM-ION RECHARGEABLE BATTERY

(71) Applicant: HUAWEI TECHNOLOGIES CO., LTD., Shenzhen (CN)

(72) Inventors: Jiahua Liang, Shenzhen (CN); Shengan Xia, Shenzhen (CN); Fengchao Xie, Dongguan (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 155 days.

(21) Appl. No.: 18/147,609

(22) Filed: Dec. 28, 2022

(65) Prior Publication Data

US 2023/0170475 A1 Jun. 1, 2023

Related U.S. Application Data

(60) Division of application No. 16/010,947, filed on Jun. 18, 2018, now Pat. No. 11,569,496, which is a
(Continued)

(30) Foreign Application Priority Data

Dec. 18, 2015 (CN) .......................... 201510964585.3

(51) Int. Cl.
*H01M 4/36* (2006.01)
*C01B 32/05* (2017.01)
(Continued)

(52) U.S. Cl.
CPC ............. *H01M 4/366* (2013.01); *C01B 32/05* (2017.08); *C01B 32/21* (2017.08); *H01M 4/133* (2013.01);
(Continued)

(58) Field of Classification Search
CPC .... H01M 4/366; H01M 4/133; H01M 4/1393; H01M 4/587; H01M 10/0525;
(Continued)

(56) References Cited

U.S. PATENT DOCUMENTS

| | | |
|---|---|---|
| 8,828,608 B2 | 9/2014 | Sun et al. |
| 2012/0074610 A1 | 3/2012 | Wu et al. |

(Continued)

FOREIGN PATENT DOCUMENTS

| | | |
|---|---|---|
| CN | 1339838 A | 3/2002 |
| CN | 1848490 A | 10/2006 |

(Continued)

OTHER PUBLICATIONS

U.S. Appl. No. 16/010,947, filed Jun. 18, 2018.
(Continued)

*Primary Examiner* — Helen Oi K Conley
(74) *Attorney, Agent, or Firm* — Leydig, Voit & Mayer, Ltd.

(57) ABSTRACT

A lithium-ion rechargeable battery negative electrode active material and a preparation method thereof, a lithium-ion rechargeable battery negative electrode plate, and a lithium-ion rechargeable battery are disclosed. The negative electrode active material includes a carbon core and a coating layer formed on a surface of the carbon core, a material of the coating layer includes amorphous carbon and a doping element, and the doping element includes element nitrogen. The lithium-ion rechargeable battery negative electrode active material has the carbon core, and the coating layer
(Continued)

that includes the doping element and the amorphous carbon is provided on the surface of the carbon core.

20 Claims, 6 Drawing Sheets

Related U.S. Application Data continuation of application No. PCT/CN2016/094899, filed on Aug. 12, 2016.

(51) Int. Cl.
*C01B 32/21* (2017.01)
*H01M 4/02* (2006.01)
*H01M 4/133* (2010.01)
*H01M 4/1393* (2010.01)
*H01M 4/587* (2010.01)
*H01M 10/0525* (2010.01)

(52) U.S. Cl.
CPC ......... *H01M 4/1393* (2013.01); *H01M 4/587* (2013.01); *H01M 10/0525* (2013.01); *C01P 2002/02* (2013.01); *C01P 2002/54* (2013.01); *C01P 2004/84* (2013.01); *C01P 2006/40* (2013.01); *H01M 2004/027* (2013.01)

(58) Field of Classification Search
CPC ...... H01M 2004/027; H01M 2004/021; C01B 32/05; C01B 32/21; C01P 2002/02; C01P 2002/54; C01P 2004/84; C01P 2006/40; Y02E 60/10
See application file for complete search history.

(56) References Cited

U.S. PATENT DOCUMENTS

| | | |
|---|---|---|
| 2013/0280603 A1 | 10/2013 | Yoon et al. |
| 2014/0134521 A1 | 5/2014 | Naito et al. |
| 2014/0141328 A1 | 5/2014 | Dai et al. |
| 2015/0104697 A1 | 4/2015 | Xia et al. |
| 2015/0243969 A1 | 8/2015 | Ku et al. |
| 2017/0047585 A1 | 2/2017 | Xia et al. |
| 2017/0170465 A1 | 6/2017 | Kim et al. |

FOREIGN PATENT DOCUMENTS

| | | | | |
|---|---|---|---|---|
| CN | 102315440 A | | 1/2012 | |
| CN | 102569804 A | | 7/2012 | |
| CN | 104347857 A | | 2/2015 | |
| CN | 104347858 A | | 2/2015 | |
| CN | 104466182 A | | 3/2015 | |
| CN | 104707638 A | | 6/2015 | |
| CN | 105098185 A | | 11/2015 | |
| JP | H06267531 A | | 9/1994 | |
| JP | 11-354122 | * | 12/1999 | ............ H01M 10/05 |
| JP | 2010009948 A | * | 1/2010 | ............ H01M 4/133 |
| JP | 2014130821 A | | 7/2014 | |
| KR | 20100090068 A | * | 8/2010 | ............ H01M 50/00 |
| KR | 20150075207 A | | 7/2015 | |
| WO | 2012077653 A1 | | 6/2012 | |

OTHER PUBLICATIONS

Shuhua et al., "Study on the structure of pyrolysis products of polyacrylonitrile," Journal of Shenyang Chemical Institute (1999).
Liu et al., The enhanced electrocatalytic activity of graphene co-doped with chlorine and fluorine atoms, 2015, Elsevier, Electrochimica Acta 177, 36-42.

* cited by examiner

LITHIUM-ION RECHARGEABLE BATTERY NEGATIVE ELECTRODE ACTIVE MATERIAL AND PREPARATION METHOD THEREOF, LITHIUM-ION RECHARGEABLE BATTERY NEGATIVE ELECTRODE PLATE, AND LITHIUM-ION RECHARGEABLE BATTERY

CROSS-REFERENCE TO RELATED APPLICATIONS

This application is a divisional application of U.S. patent application Ser. No. 16/010,947 (now U.S. Pat. No. 11,569, 496), filed on Jun. 18, 2018, which is a continuation of International Application No. PCT/CN2016/094899, filed on Aug. 12, 2016. The International Application claims priority to Chinese Patent Application No. 201510964585.3, filed on Dec. 18, 2015. All of the afore-mentioned patent applications are hereby incorporated by reference in their entireties.

TECHNICAL FIELD

The present application relates to the field of lithium-ion rechargeable batteries, and in particular, to a lithium-ion rechargeable battery negative electrode active material and a preparation method thereof, a lithium-ion rechargeable battery negative electrode plate, and a lithium-ion rechargeable battery.

BACKGROUND

Currently, with rapid development of electronic technologies, electronic products have become necessities in people's life. However, an improvement speed of battery energy densities is far behind a development speed of the electronic technologies. Therefore, the low battery energy density becomes one of bottlenecks of the electronic products. Fast charge is a popular technology that attracts more attention in recent one or two years and that greatly improves user experience.

A negative electrode material is one of the most critical materials for fast charging a lithium-ion battery. However, an existing frequently-used common carbon negative electrode material has poor high-current charge/discharge performance, affecting fast charge performance of the lithium-ion battery, especially a fast charge capability at a low temperature. Therefore, to improve user experience and improve fast charge performance of a lithium-ion battery, especially fast charge at a low temperature, it is necessary to provide a lithium-ion battery negative electrode material that has a high energy density and a high-rate charge/discharge characteristic, especially a fast charge capability at a low temperature.

SUMMARY

In view of this, a first aspect of the present application provides a lithium-ion rechargeable battery negative electrode active material. The negative electrode active material has a high energy density and a high-rate charge/discharge characteristic, especially a fast charge capability at a low temperature, so as to resolve a problem that an existing common carbon material has poor high-current charge/discharge performance and poor fast charge performance, especially a poor fast charge capability at a low temperature.

According to the first aspect, the present application provides a lithium-ion rechargeable battery negative electrode active material. The negative electrode active material includes a carbon core and a coating layer formed on a surface of the carbon core, a material of the coating layer includes amorphous carbon and a doping element, and the doping element includes element nitrogen.

In the first aspect of the present application, the coating layer is of a double-layer structure or a single-layer structure.

Specifically, in the first aspect of the present application, the coating layer is of a double-layer structure, the coating layer includes an amorphous carbon layer and a doped layer sequentially formed on the surface of the carbon core, and the doped layer is the outermost layer; or the coating layer includes a doped layer and an amorphous carbon layer sequentially formed on the surface of the carbon core, the amorphous carbon layer is the outermost layer, and the doped layer includes element carbon and the doping element. A thickness of the amorphous carbon layer is 0.1 μm to 10 μm, and a thickness of the doped layer is 0.1 μm to 10 μm.

When the coating layer is of a double-layer structure, mass content of the doped layer in the entire negative electrode active material is 0.1% to 30%, and mass content of the doping element in the doped layer is 0.1% to 30%.

In the first aspect of the present application, the coating layer is of a single-layer structure, and the doping element is dispersed in the amorphous carbon. When the coating layer is of a single-layer structure, mass content of the coating layer in the entire negative electrode active material is 0.1% to 30%, and mass content of the doping element in the coating layer is 0.1% to 20%. When the doping element and the amorphous carbon are on a same layer, that is, when the coating layer is of a single-layer structure, a thickness of the coating layer is 0.1 μm to 10 μm.

In the first aspect of the present application, the amorphous carbon is any one or a mixture of bitumen, epoxy resin, or Bakelite resin.

In the first aspect of the present application, mass content of the amorphous carbon in the entire negative electrode active material is 0.1% to 30%.

In the first aspect of the present application, the doping element further includes one or more of element P, element B, element S, element O, element F, element Cl, or element H.

In the first aspect of the present application, a material of the carbon core includes at least one of natural graphite, artificial graphite, expanded graphite, graphite oxide, hard carbon, soft carbon, graphene, carbon nanotube, or carbon fiber.

Compared with the prior art, the lithium-ion rechargeable battery negative electrode active material provided in the first aspect of the present application has the carbon core, and the coating layer that includes the doping element and the amorphous carbon is provided on the surface of the carbon core. The doping element may cause a lattice defect on the carbon layer. This not only can improve electron cloud mobility, but also can reduce energy barriers of lithium storage, increase lithium storage binding sites, and increase an interlayer spacing of the carbon material, thereby greatly increasing a lithium-ion mobility speed and expanding lithium storage space and channels. In this way, a capacity and fast charge performance of the material are greatly improved. Coating by the amorphous carbon can greatly improve low-temperature fast charge performance of the negative electrode material. Therefore, the lithium-ion rechargeable battery negative electrode active material provided in the present application not only can increase a capacity of a carbon material, but also can achieve a faster charge speed, especially a faster charge speed at a low temperature, thereby resolving a problem that an existing common carbon material has poor high-current charge/discharge performance and poor fast charge performance, especially a poor fast charge capability at a low temperature.

According to a second aspect, the present application provides a preparation method of a lithium-ion rechargeable battery negative electrode active material, including the following steps:

mixing a carbon material and an amorphous carbon material with an ionic liquid, to obtain a mixture; and putting the mixture into a reaction kettle, introducing a mixed gas of an inert carrier gas and a small organic molecule containing a doping element, and keeping the mixture at 500° C. to 1200° C. for 1 hour to 12 hours, to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a single-layer structure, and the doping element is dispersed in the amorphous carbon.

According to a third aspect, the present application provides a preparation method of a lithium-ion rechargeable battery negative electrode active material, including the following steps:

(1) mixing a carbon material with an amorphous carbon material, and performing coating and charring processing at 400° C. to 1200° C., to obtain a carbon negative electrode material coated by amorphous carbon;

(2) putting the obtained carbon negative electrode material into a reaction kettle, ultrasonically dispersing the carbon negative electrode material in a first mixed solution, and adding an oxidant to the first mixed solution, to obtain a suspension; adding a pyrrole monomer to the suspension, to obtain a second mixed solution; keeping the second mixed solution at 0° C. to 5° C. for 1 hour to 24 hours, to obtain a black precipitate; and washing the black precipitate to neutral and drying the black precipitate, where the first mixed solution is obtained by dissolving a surfactant in an acid solution, a molar ratio of the surfactant to the acid solution is 1:2 to 1:10, and a molar ratio of the added oxidant to the pyrrole monomer is 1:0.5 to 1:5; and (3) putting the dried black precipitate into a reaction kettle, introducing a mixed gas of an inert carrier gas and a hydride containing a doping element, and keeping the black precipitate at 500° C. to 1200° C. for 1 hour to 12 hours, to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a double-layer structure, the coating layer includes an amorphous carbon layer and a doped layer sequentially formed on the surface of the carbon core, and the doped layer includes element carbon and the doping element.

According to a fourth aspect, the present application provides a preparation method of a lithium-ion rechargeable battery negative electrode active material, including the following steps:

(1) putting a carbon material into a reaction kettle, ultrasonically dispersing the carbon material in a first mixed solution, and adding an oxidant to the first mixed solution, to obtain a suspension; adding a pyrrole monomer to the suspension, to obtain a second mixed solution; keeping the second mixed solution at 0° C. to 5° C. for 1 hour to 24 hours, to obtain a black precipitate; and washing the black precipitate to neutral and drying the black precipitate, where the first mixed solution is obtained by dissolving a surfactant in an acid solution, a molar ratio of the surfactant to the acid solution is 1:2 to 1:10, and a molar ratio of the added oxidant to the pyrrole monomer is 1:0.5 to 1:5;

(2) putting the dried black precipitate into a reaction kettle, introducing a mixed gas of an inert carrier gas and a hydride containing a doping element, and keeping the black precipitate at 500° C. to 1200° C. for 1 hour to 12 hours, to obtain a negative electrode material coated by a doped layer; and (3) mixing an amorphous carbon material with the obtained negative electrode material that is coated by the doped layer, and performing coating and charring processing at 400° C. to 1200° C., to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a double-layer structure, the coating layer includes a doped layer and an amorphous carbon layer sequentially formed on the surface of the carbon core, and the doped layer includes element carbon and the doping element.

The preparation method of a lithium-ion rechargeable battery negative electrode active material provided in the present application in simple in process and has low costs, and therefore is applicable to mass production.

According to a fifth aspect, the present application provides a lithium-ion rechargeable battery negative electrode plate. The lithium-ion rechargeable battery negative electrode plate includes a current collector and the lithium-ion rechargeable battery negative electrode active material in the first aspect of the present application that is coated on the current collector.

The lithium-ion rechargeable battery negative electrode plate according to the fifth aspect of the present application has a large capacity, a long service life, and high fast charge performance.

According to a sixth aspect, the present application provides a lithium-ion rechargeable battery. The lithium-ion rechargeable battery includes a lithium-ion rechargeable battery negative electrode plate, a positive electrode plate, a separator, a non-aqueous electrolyte, and an enclosure, and the lithium-ion rechargeable battery negative electrode plate includes a current collector and the lithium-ion rechargeable battery negative electrode active material in the first aspect of the present application that is coated on the current collector.

The lithium-ion rechargeable battery according to the sixth aspect of the present application has a large capacity, a long service life, and high fast charge performance.

Some advantages of the embodiments of the present application are described below in this specification, and some are obvious according to this specification, or can be learned according to implementation of the embodiments of the present application.

DESCRIPTION OF EMBODIMENTS

Figure 1:
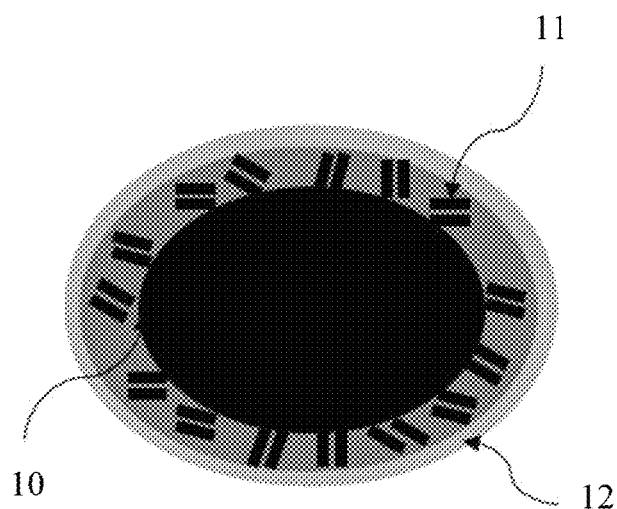
FIG. 1 is a schematic structural diagram of a lithium-ion rechargeable battery negative electrode active material according to Embodiment 1 of the present application.

The following descriptions are some implementations of the embodiments of the present application. It should be noted that a person of ordinary skill in the art may make some improvements and polishing without departing from the principle of the embodiments of the present application, and the improvements and polishing shall fall within the protection scope of the embodiments of the present application.

Currently, in a lithium-ion battery, a negative electrode material is one of critical materials affecting fast charge performance of the lithium-ion battery. However, an existing common carbon negative electrode material has poor high-current charge/discharge performance and poor fast charge performance, especially a poor fast charge capability at a low temperature. Therefore, to improve user experience and improve fast charge performance of a lithium-ion battery, especially fast charge at a low temperature, an embodiment of the present application provides a lithium-ion rechargeable battery negative electrode active material that has a high energy density and a high-rate charge/discharge characteristic, especially a fast charge capability at a low temperature.

Specifically, this embodiment of the present application provides a lithium-ion rechargeable battery negative electrode active material. The negative electrode active material includes a carbon core and a coating layer formed on a surface of the carbon core. A material of the coating layer includes amorphous carbon and a doping element. The doping element includes element nitrogen.

In an implementation of the present application, the coating layer may be of a single-layer structure or a double-layer structure.

In a first implementation of the present application, the coating layer is of a double-layer structure, and the coating layer includes an amorphous carbon layer formed on the surface of the carbon core and a doped layer formed on a surface of the amorphous carbon layer. The doped layer includes element carbon and the doping element. The doping element is evenly distributed on the doped layer.

In a second implementation of the present application, the coating layer is of a double-layer structure, and the coating layer includes a doped layer formed on the surface of the carbon core and an amorphous carbon layer formed on a surface of the doped layer. The doped layer includes element carbon and the doping element. The doping element is evenly distributed on the doped layer.

In this implementation of the present application, when the coating layer is of a double-layer structure, a thickness of the amorphous carbon layer is 0.1 μm to 10 μm, and a thickness of the doped layer is 0.1 μm to 10 μm. Mass content of the doped layer in the entire negative electrode active material is 0.1% to 30%, and is preferably 0.5% to 10%. Mass content of the doping element in the doped layer is 0.1% to 30%, and is preferably 1% to 15%. A main element composition of the doped layer is element carbon. The element carbon may come from a nitrogen compound such as pyrrole or pyridine. Mass content of the element carbon in the doped layer is 70% to 99.9%, and is preferably 85% to 99%. The doping element is evenly distributed on the doped layer. Using nitrogen doping as an example, a part of the doping element, that is, element nitrogen comes from pyrrole or pyridine, and another part of the doping element may be obtained by further introducing and doping nitrogen-containing gas molecules. After doping is performed, on the doped layer, an original circular structure of pyridine and pyrrole is broken, and a hole structure is formed, thereby improving a lithium storage capability and conductivity of the negative electrode active material.

In a third implementation of the present application, the coating layer is of a single-layer structure. That is, the doping element and the amorphous carbon are on a same layer, and the doping element is dispersed in the amorphous carbon. In this case, a thickness of the coating layer is 0.1 μm to 10 μm. Mass content of the coating layer in the entire negative electrode active material is 0.1% to 30%, and is preferably 0.5% to 15%. Mass content of the doping element in the coating layer is 0.1% to 20%, and is preferably 0.2% to 10%.

In this implementation of the present application, the amorphous carbon may be any one or a mixture of bitumen, epoxy resin, or Bakelite resin. Mass content of the amorphous carbon in the entire negative electrode active material is 0.1% to 30%. In a preferred implementation of the present application, mass content of the amorphous carbon in the entire negative electrode active material is 0.2% to 10%.

In this implementation of the present application, the doping element further includes one or more of element P, element B, element S, element O, element F, element Cl, or element H.

In this implementation of the present application, a material of the carbon core includes at least one of natural graphite, artificial graphite, expanded graphite, graphite oxide, hard carbon, soft carbon, graphene, carbon nanotube, or carbon fiber.

Compared with the prior art, the lithium-ion rechargeable battery negative electrode active material provided in this embodiment of the present application has the carbon core, and the coating layer that includes the doping element and the amorphous carbon is provided on the surface of the carbon core. The doping element may cause a lattice defect on the carbon layer. This not only can improve electron cloud mobility, but also can reduce energy barriers of lithium storage, increase lithium storage binding sites, and increase an interlayer spacing of the carbon material, thereby greatly increasing a lithium-ion mobility speed and expanding lithium storage space and channels. In this way, a capacity and fast charge performance of the material are greatly improved. Coating by the amorphous carbon can greatly improve low-temperature fast charge performance of the negative electrode material. Therefore, the lithium-ion rechargeable battery negative electrode active material provided in this embodiment of the present application not only can increase a capacity of a carbon material, but also can achieve a faster charge speed, especially a faster charge speed at a low temperature, thereby resolving a problem that an existing common carbon material has poor high-current charge/discharge performance and poor fast charge performance, especially a poor fast charge capability at a low temperature.

Correspondingly, an embodiment of the present application further provides a preparation method of a lithium-ion rechargeable battery negative electrode active material, including the following steps:

A carbon material and an amorphous carbon material are mixed with an ionic liquid, to obtain a mixture; and the mixture is put into a reaction kettle, a mixed gas of an inert carrier gas and a small organic molecule containing a doping element is introduced, and the mixture is kept at 500° C. to 1200° C. for 1 hour to 12 hours, to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a single-layer structure, and the doping element is dispersed in the amorphous carbon.

In an implementation of the present application, the carbon material includes at least one of natural graphite, artificial graphite, expanded graphite, graphite oxide, hard carbon, soft carbon, graphene, carbon nanotube, or carbon fiber. The amorphous carbon may be any one or a mixture of bitumen, epoxy resin, or Bakelite resin. The ionic liquid may be one of triphenyl boron, 3-methyl-butyl pyridinium dicyanamide, or 1-ethyl-3-methylimidazolium dicyanamide. Mass content of the added ionic liquid in the carbon material is 1:1 to 10:1.

In an implementation of the present application, a rate of introducing the mixed gas of the inert carrier gas and the small organic molecule containing the doping element is 5 mL/min to 300 mL/min. A volume ratio of the small organic molecule containing the doping element to the inert carrier gas is 1:1 to 1:10.

In a preferred implementation of the present application, the mixture may be kept at 600° C. to 1000° C. for 2 hours to 6 hours after the mixed gas is introduced.

In an implementation of the present application, the doping element further includes one or more of element P, element B, element S, element O, element F, element Cl, or element H. The small organic molecule is a compound that can provide a doping element such as N, P, B, S, O, F, Cl, or H. Specifically, the small organic molecule may include one of pyridine, pyrrole, or thiophene.

In this implementation of the present application, mass content of the amorphous carbon in the entire negative electrode active material is 0.1% to 30%. In a preferred implementation of the present application, mass content of the amorphous carbon in the entire negative electrode active material is 0.2% to 10%. Mass content of the coating layer in the entire negative electrode active material is 0.1% to 30%, and is preferably 0.5% to 15%. Mass content of the doping element in the coating layer is 0.1% to 20%, and is preferably 0.2% to 10%.

Correspondingly, an embodiment of the present application provides another preparation method of a lithium-ion rechargeable battery negative electrode active material, including the following steps:

(1) Mix a carbon material with an amorphous carbon material, and perform coating and charring processing at 400° C. to 1200° C., to obtain a carbon negative electrode material coated by amorphous carbon.

(2) Put the obtained carbon negative electrode material into a reaction kettle, ultrasonically disperse the carbon negative electrode material in a first mixed solution, and add an oxidant to the first mixed solution, to obtain a suspension; add a pyrrole monomer to the suspension, to obtain a second mixed solution; keep the second mixed solution at 0° C. to 5° C. for 1 hour to 24 hours, to obtain a black precipitate; and wash the black precipitate to neutral and dry the black precipitate, where the first mixed solution is obtained by dissolving a surfactant in an acid solution, a molar ratio of the surfactant to the acid solution is 1:2 to 1:10, and a molar ratio of the added oxidant to the pyrrole monomer is 1:0.5 to 1:5.

(3) Put the dried black precipitate into a reaction kettle, introduce a mixed gas of an inert carrier gas and a hydride containing a doping element, and keep the black precipitate at 500° C. to 1200° C. for 1 hour to 12 hours, to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a double-layer structure, the coating layer includes an amorphous carbon layer and a doped layer sequentially formed on the surface of the carbon core, and the doped layer includes element carbon and the doping element.

In an implementation of the present application, in step (1), the carbon material includes at least one of natural graphite, artificial graphite, expanded graphite, graphite oxide, hard carbon, soft carbon, graphene, carbon nanotube, or carbon fiber. The amorphous carbon may be any one or a mixture of bitumen, epoxy resin, or Bakelite resin. The coating and charring processing may be specifically: performing coating processing at 400° C. to 800° C. for 2 hours to 6 hours, and then performing charring processing at 800° C. to 1200° C. for 2 hours to 6 hours. The charring processing is performed in an atmosphere of a protective gas. The protective gas may be nitrogen.

In an implementation of the present application, in step (2), the surfactant may be hexadecyl trimethyl ammonium bromide, sodium dodecyl benzene sulfonate, or carboxymethylcellulose sodium. The acid solution may be hydrochloric acid, sulfuric acid, nitric acid, or phosphoric acid. The oxidant may be ammonium persulfate, ferric chloride, or ferrous sulfate. An amount of the added pyrrole monomer may be determined according to an expected doping concentration. The washing the black precipitate to neutral and drying the black precipitate may be specifically: washing the black precipitate by sequentially using a 1 mol/L HCl solution and purified water until the black precipitate is neutral, and then drying the black precipitate at 80° C. for 12 hours.

In an implementation of the present application, in step (3), a rate of introducing the mixed gas of the inert carrier gas and the hydride containing the doping element may be 5 mL/min to 300 mL/min. A volume ratio of the hydride containing the doping element to the inert carrier gas may be 1:1 to 1:10. The hydride containing the doping element is a hydride that can provide a doping element such as N, P, B, S, O, F, Cl, or H. Specifically, for example, the hydride may be $NH_3$ or $N_2H_4$. The inert carrier gas may be nitrogen, argon, helium, or the like. In a preferred implementation of the present application, the black precipitate is kept at 600° C. to 1000° C. for 2 hours to 6 hours after the mixed gas is introduced.

In an implementation of the present application, mass content of the amorphous carbon in the entire negative electrode active material is 0.1% to 30%. In a preferred implementation of the present application, mass content of the amorphous carbon in the entire negative electrode active material is 0.2% to 10%. The doping element further includes one or more of element P, element B, element S, element O, element F, element Cl, or element H. A thickness of the amorphous carbon layer is 0.1 μm to 10 μm, and a thickness of the doped layer is 0.1 μm to 10 Mass content of the doped layer in the entire negative electrode active material is 0.1% to 30%, and is preferably 0.5% to 10%. Mass content of the doping element in the doped layer is 0.1% to 30%, and is preferably 1% to 15%.

Correspondingly, an embodiment of the present application provides still another preparation method of a lithium-ion rechargeable battery negative electrode active material, including the following steps:

(1) Put a carbon material into a reaction kettle, ultrasonically disperse the carbon material in a first mixed solution, and add an oxidant to the first mixed solution, to obtain a suspension; add a pyrrole monomer to the suspension, to obtain a second mixed solution; keep the second mixed solution at 0° C. to 5° C. for 1 hour to 24 hours, to obtain a black precipitate; and wash the black precipitate to neutral and drying the black precipitate, where the first mixed solution is obtained by dissolving a surfactant in an acid solution, a molar ratio of the surfactant to the acid solution is 1:2 to 1:10, and a molar ratio of the added oxidant to the pyrrole monomer is 1:0.5 to 1:5.

(2) Put the dried black precipitate into a reaction kettle, introduce a mixed gas of an inert carrier gas and a hydride containing a doping element, and keep the black precipitate at 500° C. to 1200° C. for 1 hour to 12 hours, to obtain a negative electrode material coated by a doped layer.

(3) Mix an amorphous carbon material with the obtained negative electrode material that is coated by the doped layer, and perform coating and charring processing at 400° C. to 1200° C., to obtain a lithium-ion rechargeable battery negative electrode active material, where the lithium-ion rechargeable battery negative electrode active material includes a carbon core and a coating layer formed on a surface of the carbon core, a material of the coating layer includes amorphous carbon and a doping element, the doping element includes element nitrogen, the coating layer is of a double-layer structure, the coating layer includes a doped layer and an amorphous carbon layer sequentially formed on the surface of the carbon core, and the doped layer includes element carbon and the doping element.

In an implementation of the present application, in step (1), the carbon material includes at least one of natural graphite, artificial graphite, expanded graphite, graphite oxide, hard carbon, soft carbon, graphene, carbon nanotube, or carbon fiber.

The surfactant may be hexadecyl trimethyl ammonium bromide, sodium dodecyl benzene sulfonate, or carboxymethylcellulose sodium. The acid solution may be hydrochloric acid, sulfuric acid, nitric acid, or phosphoric acid. The oxidant may be ammonium persulfate, ferric chloride, or ferrous sulfate. An amount of the added pyrrole monomer is determined according to an expected doping concentration. The washing the black precipitate to neutral and drying the black precipitate may be specifically: washing the black precipitate by sequentially using a 1 mol/L HCl solution and purified water until the black precipitate is neutral, and then drying the black precipitate at 80° C. for 12 hours.

In an implementation of the present application, in step (2), a rate of introducing the mixed gas of the inert carrier gas and the hydride containing the doping element is 5 mL/min to 300 mL/min. A volume ratio of the hydride containing the doping element to the inert carrier gas is 1:1 to 1:10. The hydride containing the doping element is a hydride that can provide a doping element such as N, P, B, S, O, F, Cl, or H. Specifically, for example, the hydride may be $NH_3$ or $N_2H_4$. The inert carrier gas may be nitrogen, argon, helium, or the like. In a preferred implementation of the present application, the black precipitate is kept at 600° C. to 1000° C. for 2 hours to 6 hours after the mixed gas is introduced.

In an implementation of the present application, in step (3), the amorphous carbon may be any one or a mixture of bitumen, epoxy resin, or Bakelite resin. The coating and charring processing is specifically: performing coating processing at 400° C. to 800° C. for 2 hours to 6 hours, and then performing charring processing at 800° C. to 1200° C. for 2 hours to 6 hours. The charring processing is performed in an atmosphere of a protective gas. The protective gas may be nitrogen.

In an implementation of the present application, mass content of the amorphous carbon in the entire negative electrode active material is 0.1% to 30%. In a preferred implementation of the present application, mass content of the amorphous carbon in the entire negative electrode active material is 0.2% to 10%. The doping element further includes one or more of element P, element B, element S, element O, element F, element Cl, or element H. A thickness of the amorphous carbon layer is 0.1 μm to 10 μm, and a thickness of the doped layer is 0.1 μm to 10 Mass content of the doped layer in the entire negative electrode active material is 0.1% to 30%, and is preferably 0.5% to 10%. Mass content of the doping element in the doped layer is 0.1% to 30%, and is preferably 1% to 15%.

The preparation method of a lithium-ion rechargeable battery negative electrode active material provided in this embodiment of the present application in simple in process and has low costs, and therefore is applicable to mass production.

An embodiment of the present application further provides a lithium-ion rechargeable battery negative electrode plate and a lithium-ion rechargeable battery that use the lithium-ion rechargeable battery negative electrode active material provided in the foregoing embodiments of the present application.

This embodiment of the present application is further described below by using multiple embodiments. The embodiments of the present application are not limited to the following specific embodiments. Implementation may be appropriately modified without changing the scope of the independent claims.

Embodiment 1

A preparation method of a lithium-ion rechargeable battery negative electrode active material is provided, including the following steps:

(1) Take and weigh 3.0 kg artificial graphite, 0.3 kg petroleum bitumen that is comminuted to a particle size of less than 0.1 mm, and 0.02 kg Bakelite resin, evenly stir them and put them into a reaction kettle, perform heating and coating processing at 500° C. for 2 hours, introduce nitrogen for protection, perform charring processing at 1000° C. for 4 hours, and then cool down a reaction product to room temperature, to obtain amorphous carbon-coated artificial graphite.

(2) Dissolve hexadecyl trimethyl ammonium bromide (CTAB, 0.5 kg) in an HCl (8 L, 1 mol/L) solution in an ice water bath, to obtain a first mixed solution; add 2.0 kg of the obtained amorphous carbon-coated artificial graphite to the first mixed solution, ultrasonically disperse the artificial graphite for 30 minutes, and then add ammonium persulfate (APS, 0.8 kg) to the first mixed solution, so as to immediately form a white suspension; stir the suspension for 0.5 hour, and then add 0.5 L pyrrole monomer to the suspension, to obtain a second mixed solution; keep the second mixed solution at 4° C. for 24 hours and then filter the second mixed solution, to obtain a black precipitate; wash the black precipitate by using a 1 mol/L HCl solution for three times, and then wash the black precipitate by using purified water until a solution is colorless and neutral; and then dry the precipitate at 80° C. for 12 hours, to obtain a dried precipitate.

(3) Finally, put the dried precipitate into a reaction kettle, introduce an $N_2H_4$/Ar mixed gas in which volume content of $N_2H_4$ is 10%, and sinter the precipitate at 700° C. for 6 hours, to obtain a lithium-ion rechargeable battery negative electrode active material.

Figure 2:
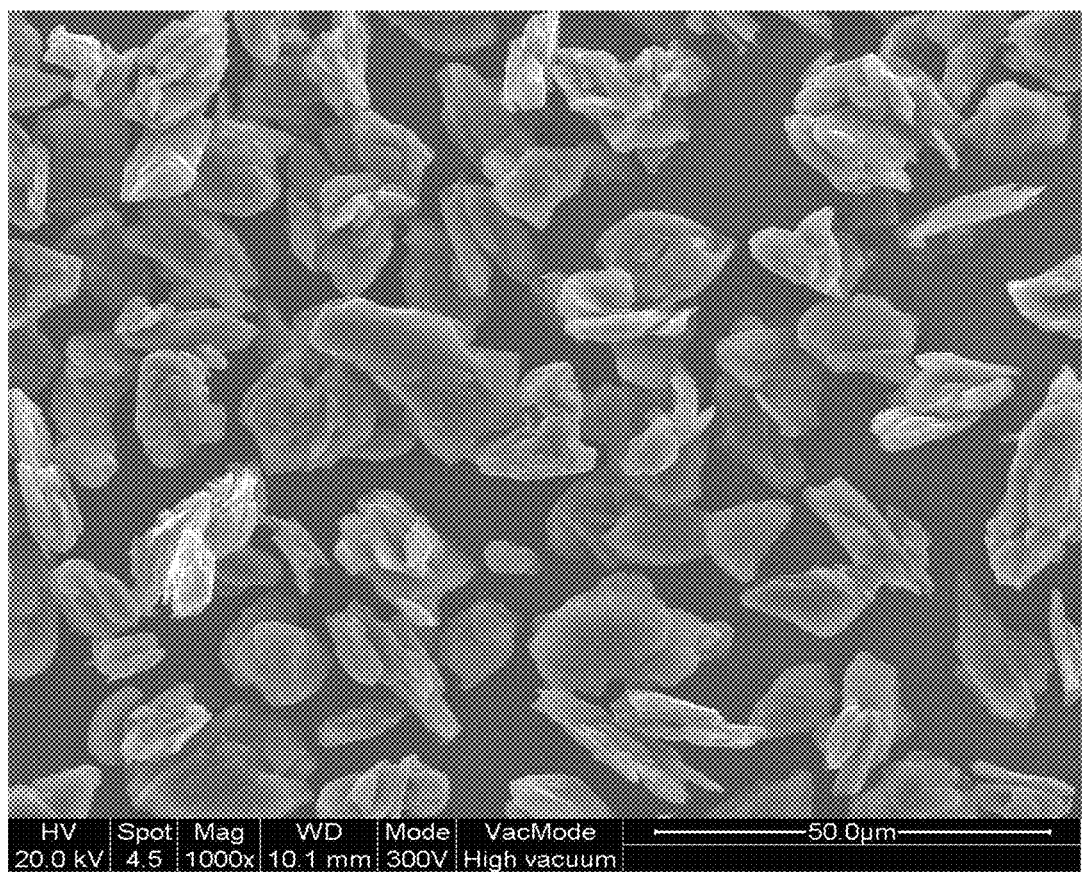
FIG. 2 is a SEM diagram of a lithium-ion rechargeable battery negative electrode active material according to Embodiment 1 of the present application.

FIG. 1 is a schematic structural diagram of a lithium-ion rechargeable battery negative electrode active material according to this embodiment. It can be learned from FIG. 1 that the lithium-ion rechargeable battery negative electrode active material in this embodiment includes an artificial graphite core 10 and a coating layer formed on a surface of the artificial graphite core 10. The coating layer is of a double-layer structure. An inner layer of the coating layer is an amorphous carbon layer 11, and an outer layer of the coating layer is a doped layer 12 doped with N. In this embodiment, a thickness of the amorphous carbon layer is 3 μm, and a thickness of the doped layer is 1 μm. In the negative electrode active material, mass content of amorphous carbon is 3.9%, and mass content of the doped layer is 1%. Mass content of a doping element in the doped layer is 9%. FIG. 2 is a SEM diagram of the lithium-ion rechargeable battery negative electrode active material according to this embodiment. It can be learned from FIG. 2 that a coating layer is formed on a graphite surface.

Embodiment 2

A preparation method of a lithium-ion rechargeable battery negative electrode active material is provided, including the following steps:

(1) Dissolve hexadecyl trimethyl ammonium bromide (CTAB, 0.5 kg) in an HCl (8 L, 1 mol/L) solution in an ice water bath, to obtain a first mixed solution; add 2.0 kg artificial graphite to the first mixed solution, ultrasonically disperse the artificial graphite for 30 minutes, and then add ammonium persulfate (APS, 0.8 kg) to the first mixed solution, so as to immediately form a white suspension; stir the suspension for 0.5 hour, and then add 0.5 L pyrrole monomer to the suspension, to obtain a second mixed solution; keep the second mixed solution at 4° C. for 24 hours and then filter the second mixed solution, to obtain a black precipitate; wash the black precipitate by using a 1 mol/L HCl solution for three times, and then wash the black precipitate by using purified water until a solution is colorless and neutral; then dry the precipitate at 80° C. for 12 hours, to obtain a dried precipitate; and put the dried precipitate into a reaction kettle, introduce an $N_2H_4$/Ar mixed gas in which volume content of $N_2H_4$ is 10%, and sinter the precipitate at 700° C. for 6 hours, to obtain artificial graphite coated by an N-doped layer.

Figure 3:
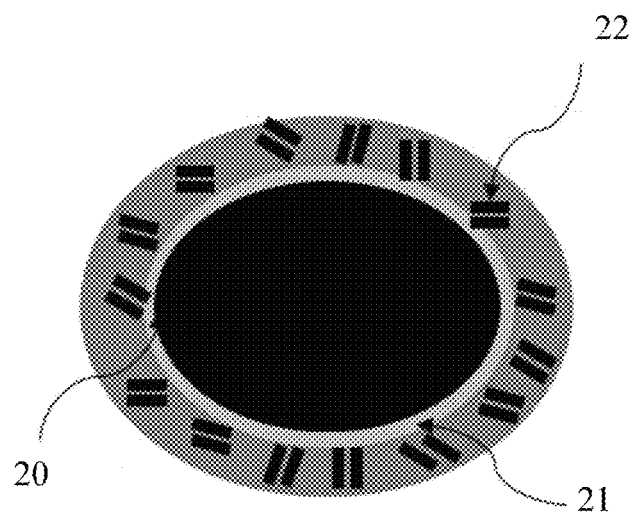
FIG. 3 is a schematic structural diagram of a lithium-ion rechargeable battery negative electrode active material according to Embodiment 2 of the present application.

(2) Take and weigh 1.5 kg of the obtained artificial graphite coated by the N-doped layer, 0.15 g petroleum bitumen that is comminuted to a particle size of less than 0.1 mm, and 0.01 kg Bakelite resin, evenly stir them and put them into a reaction kettle, perform heating and coating processing at 500° C. for 2 hours, introduce nitrogen for protection, perform charring processing at 800° C. for 4 hours, and then cool down a reaction product to room temperature, to obtain a lithium-ion rechargeable battery negative electrode active material. FIG. 3 is a schematic structural diagram of a lithium-ion rechargeable battery negative electrode active material according to this embodiment. It can be learned from FIG. 3 that the lithium-ion rechargeable battery negative electrode active material in this embodiment includes an artificial graphite core 20 and a coating layer formed on a surface of the artificial graphite core 20. The coating layer is of a double-layer structure. An inner layer of the coating layer is a doped layer 21 doped with N, and an outer layer of the coating layer is an amorphous carbon layer 22. In this embodiment, a thickness of the amorphous carbon layer is 4.2 μm, and a thickness of the doped layer is 1.3 μm. In the negative electrode active material, mass content of amorphous carbon is 5.1%, and mass content of the doped layer is 1.2%. Mass content of a doping element in the doped layer is 11%.

Embodiment 3

Figure 4:
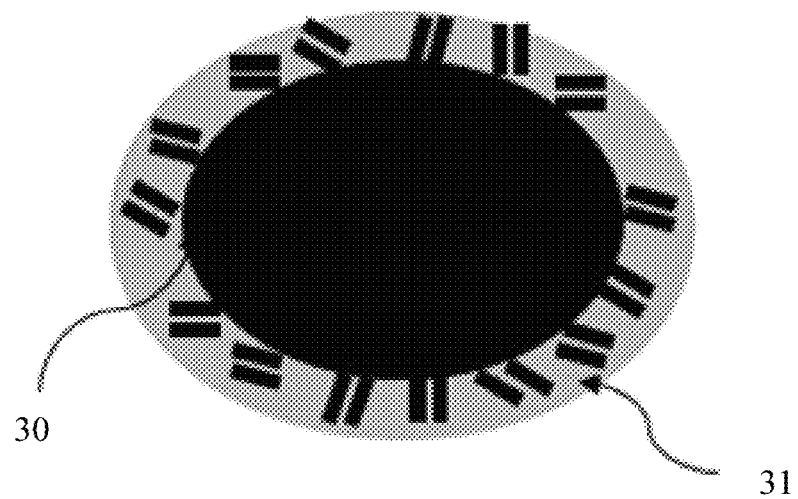
FIG. 4 is a schematic structural diagram of a lithium-ion rechargeable battery negative electrode active material according to Embodiment 3 of the present application.

A preparation method of a lithium-ion rechargeable battery negative electrode active material is provided, including the following steps:

In a dry atmosphere, 2.0 kg artificial graphite, 3.0 kg triphenyl boron, 0.1 kg bitumen and 0.1 g Bakelite resin are mixed, and are evenly stirred and mixed for 2 h, to obtain a mixture; the mixture is transferred to a reaction kettle; an $NH_3$/Ar mixed gas in which volume content of $NH_3$ is 30% is introduced, and a flow amount is controlled to be 50 mL/min; a temperature in the reaction kettle is increased to 800° C. at a heating rate of 2° C./min and is kept for 6 hours; and then the temperature is cooled down to room temperature, to obtain a lithium-ion rechargeable battery negative electrode active material. FIG. 4 is a schematic structural diagram of a lithium-ion rechargeable battery negative electrode active material according to this embodiment. It can be learned from FIG. 4 that the lithium-ion rechargeable battery negative electrode active material in this embodiment includes an artificial graphite core 30 and a coating layer 31 formed on a surface of the artificial graphite core 30. The coating layer 31 is of a single-layer structure. Element N is evenly doped in amorphous carbon. In this embodiment, a thickness of the coating layer is 5 μm. In the negative electrode active material, mass content of the amorphous carbon is 6.5%, and mass content of a doping element in the coating layer is 5%.

Embodiment 4

A preparation method of a lithium-ion rechargeable battery negative electrode active material is provided, including the following steps:

(1) Take and weigh 3.0 kg natural graphite, 0.6 kg petroleum bitumen that is comminuted to a particle size of less than 0.1 mm, and 0.2 kg epoxy resin, evenly stir them and put them into a reaction kettle, perform heating and coating processing at 600° C. for 2 hours, introduce nitrogen for protection, perform charring processing at 1000° C. for 4 hours, and then cool down a reaction product to room temperature, to obtain amorphous carbon-coated natural graphite.

(2) Dissolve hexadecyl trimethyl ammonium bromide (CTAB, 0.8 kg) in an HCl (10 L, 1 mol/L) solution in an ice water bath, to obtain a first mixed solution; add 2.0 kg of the obtained amorphous carbon-coated artificial graphite to the first mixed solution, ultrasonically disperse the artificial graphite for 30 minutes, and then add ammonium persulfate (APS, 1.0 kg) to the first mixed solution, so as to immediately form a white suspension; stir the suspension for 0.5 hour, and then add 1.0 L pyrrole monomer to the suspension, to obtain a second mixed solution; keep the second mixed solution at 4° C. for 24 hours and then filter the second mixed solution, to obtain a black precipitate; wash the black precipitate by using a 1 mol/L HCl solution for three times, and then wash the black precipitate by using purified water until a solution is colorless and neutral; and then dry the precipitate at 80° C. for 12 hours, to obtain a dried precipitate.

(3) Finally, put the dried precipitate into a reaction kettle, introduce an $N_2H_4$/Ar mixed gas in which volume content of $N_2H_4$ is 20%, and sinter the precipitate at 700° C. for 6 hours, to obtain a lithium-ion rechargeable battery negative electrode active material. In this embodiment, a thickness of an amorphous carbon layer is 8 μm, and a thickness of a doped layer is 2.1 μm. In the negative electrode active material, mass content of amorphous carbon is 11.2%, and mass content of the doped layer is 2.3%. Mass content of a doping element in the doped layer is 13%.

Comparative Example 1

Common artificial graphite without any surface processing is used as a negative electrode material in Comparative Example 1.

Comparative Example 2

Hexadecyl trimethyl ammonium bromide (CTAB, 15 g) in an HCl (240 mL, 1 mol/L) solution is dissolved in an ice water bath; 20 g artificial graphite is added to the solution, the artificial graphite is ultrasonically dispersed for 30 minutes, and then ammonium persulfate (APS, 26 g) is added to the solution, so as to immediately form a white suspension; the suspension is stirred for 0.5 hour, and then 16 mL pyrrole monomer is added; the suspension is kept at 4° C. for 24 hours and then is filtered; the obtained black precipitate is washed by using a 1 mol/L HCl solution for three times, and then the black precipitate is washed by using purified water until a solution is colorless and neutral; then the precipitate is dried at 80° C. for 12 hours; and finally, a dried precipitate is put into a reaction kettle, an $N_2H_4$/Ar mixed gas in which volume content of $N_2H_4$ is 10% is introduced, and the precipitate is sintered at 700° C. for 6 hours, to obtain an N-doped composite negative electrode material.

Preparation of electrochemical performance test sample:

Coin battery preparation: Evenly mixing the negative electrode materials in Embodiment 1 to Embodiment 4 and in Comparative Example 1 and Comparative Example 2 separately with conductive carbon black and polyvinylidene fluoride according to a mass ratio of 92:5:3 in N-methylpyrrolidone, and then coating an obtained material on a copper foil current collector; drying the material at 120° C. in a vacuum, to obtain an electrode plate; and then obtaining a coin battery by means of assembling in a glove box, for testing. Lithium metal is used in the electrode, a separator is celgard C2400, and an electrolyte is a 1.3 mol/L LiPF6/EC+PC+DEC (a volume ratio is 3:1:6) solution.

Full battery preparation: Lithium cobaltate is used in a positive electrode, the negative electrode materials in Embodiment 1 to Embodiment 4 and in Comparative Example 1 and Comparative Example 2 are separately used as a negative electrode of a lithium-ion battery, an electrolyte is a 1 mol/L LiPF6/EC+PC+DEC+EMC (a volume ratio is 1:0.3:1:1) solution, a separator is a trilayer PP/PE/PP separator, and a thickness of the separator is 16 μm. These materials are used to prepare a soft pack battery of approximately 3 Ah, for testing full-battery performance of the materials.

Effect Embodiment

Figure 5:
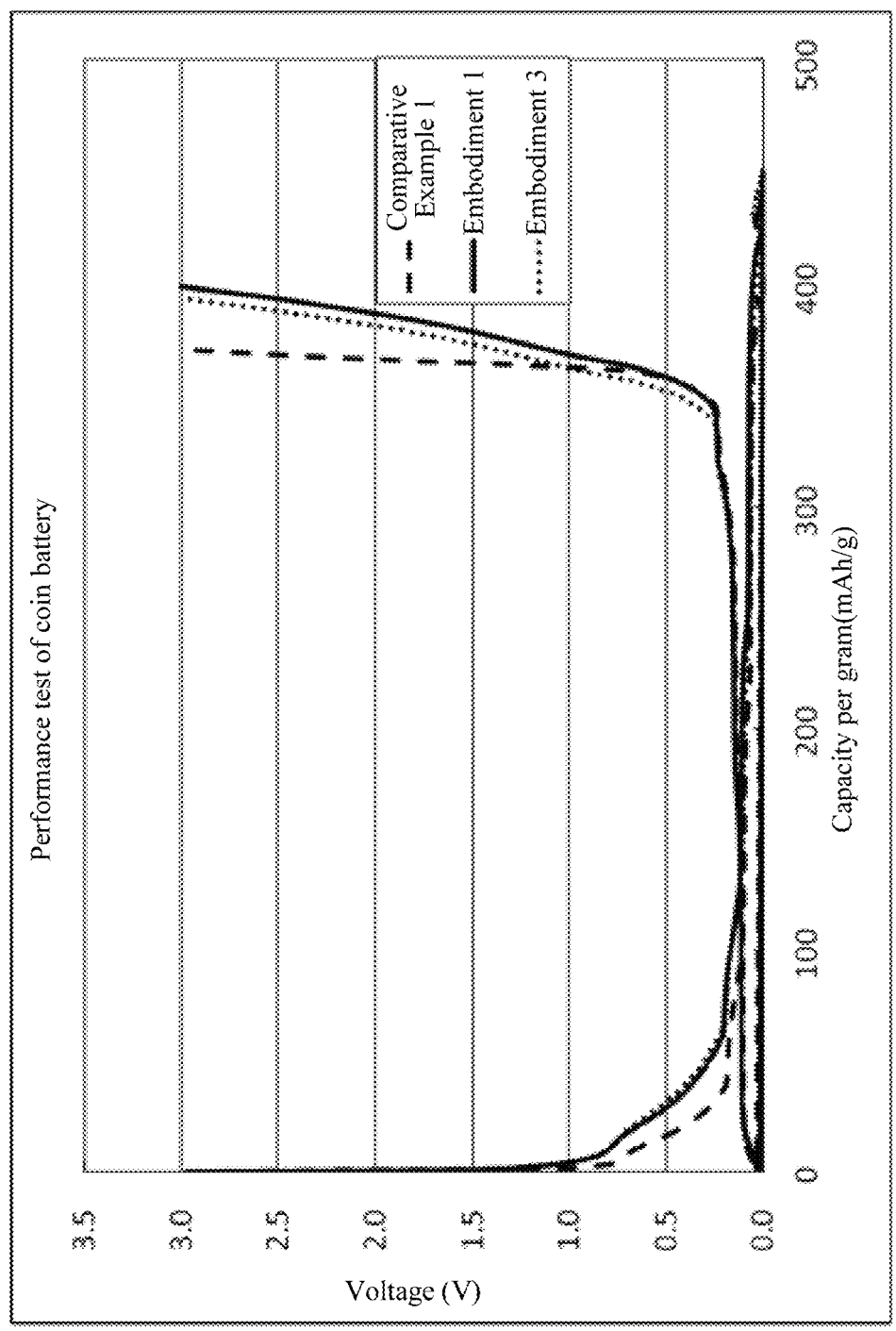
FIG. 5 is a comparison diagram of performance tests of coin batteries according to Embodiment 1, Embodiment 3, and Comparative Example 1 of the present application.
Figure 6:
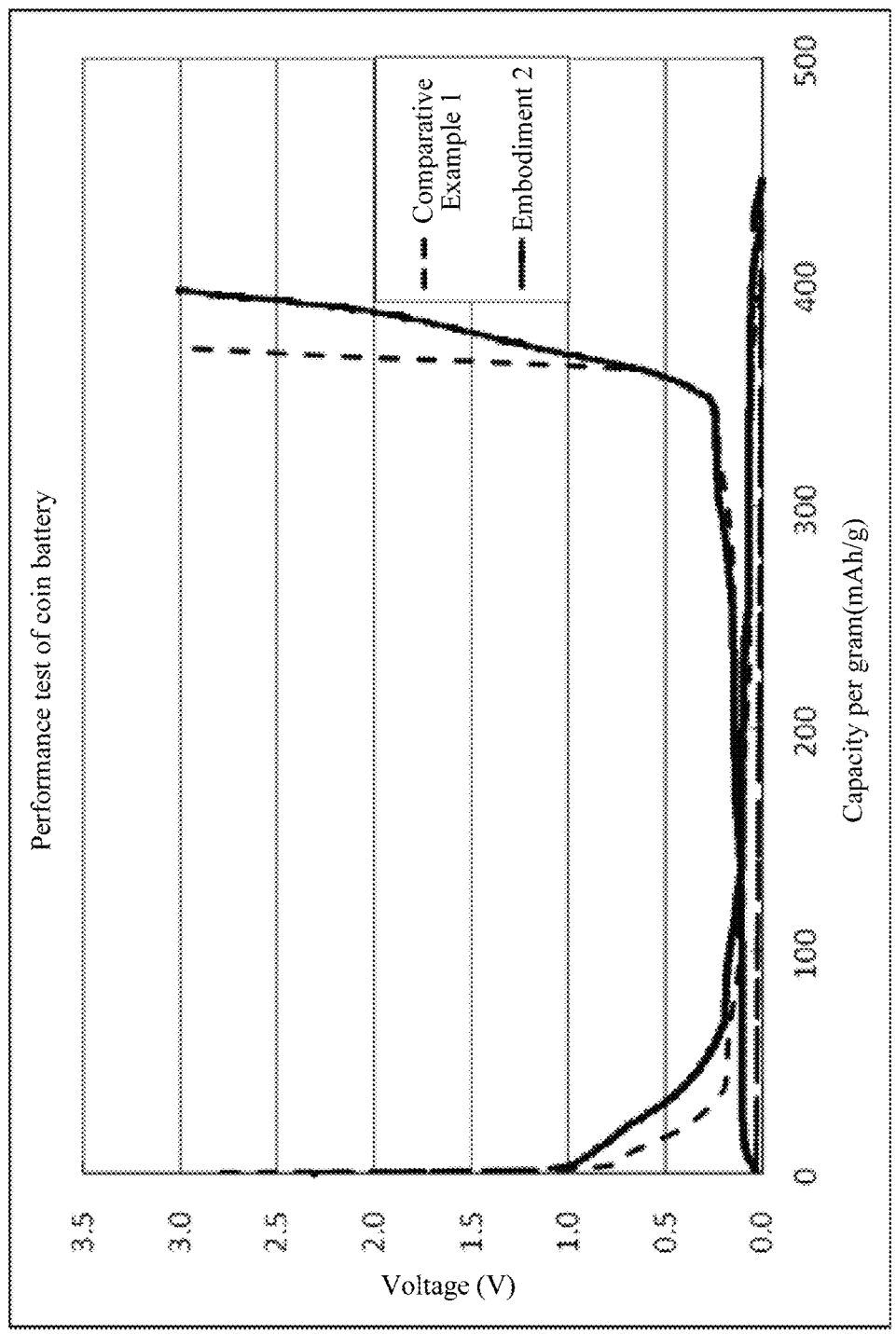
FIG. 6 is a comparison diagram of performance tests of coin batteries according to Embodiment 2 and Comparative Example 1 of the present application.

To firmly support the beneficial effects of the technical solutions in the embodiments of the present application, the following performance tests are provided:

Tests of capacity and charge/discharge performance:

FIG. 5 is a comparison diagram of tests of coin batteries according to Embodiment 1, Embodiment 3, and Comparative Example 1 of the present application. FIG. 6 is a comparison diagram of tests of coin batteries according to Embodiment 2 and Comparative Example 1 of the present application. It can be learned from FIG. 5 and FIG. 6 that a charge/discharge curve and a capacity of the negative electrode active material in Embodiment 1 is basically the same as those in Embodiment 2, where the structure of the coating layer of the negative electrode active material in Embodiment 1 is different from the structure of the coating layer of the negative electrode active material in Embodiment 2, and the capacities are greatly improved compared with the capacity of the completely uncoated graphite material in Comparative Example 1. The capacity of the negative electrode active material that is in Embodiment 3 and whose coating layer is of a single-layer structure is slightly lower than the capacity of the negative electrode active material in Embodiment 1, but is also greatly improved compared with the capacity of the graphite material in Comparative Example 1.

2. Cycle Performance Test for Fast Charge at Room Temperature

Figure 7:
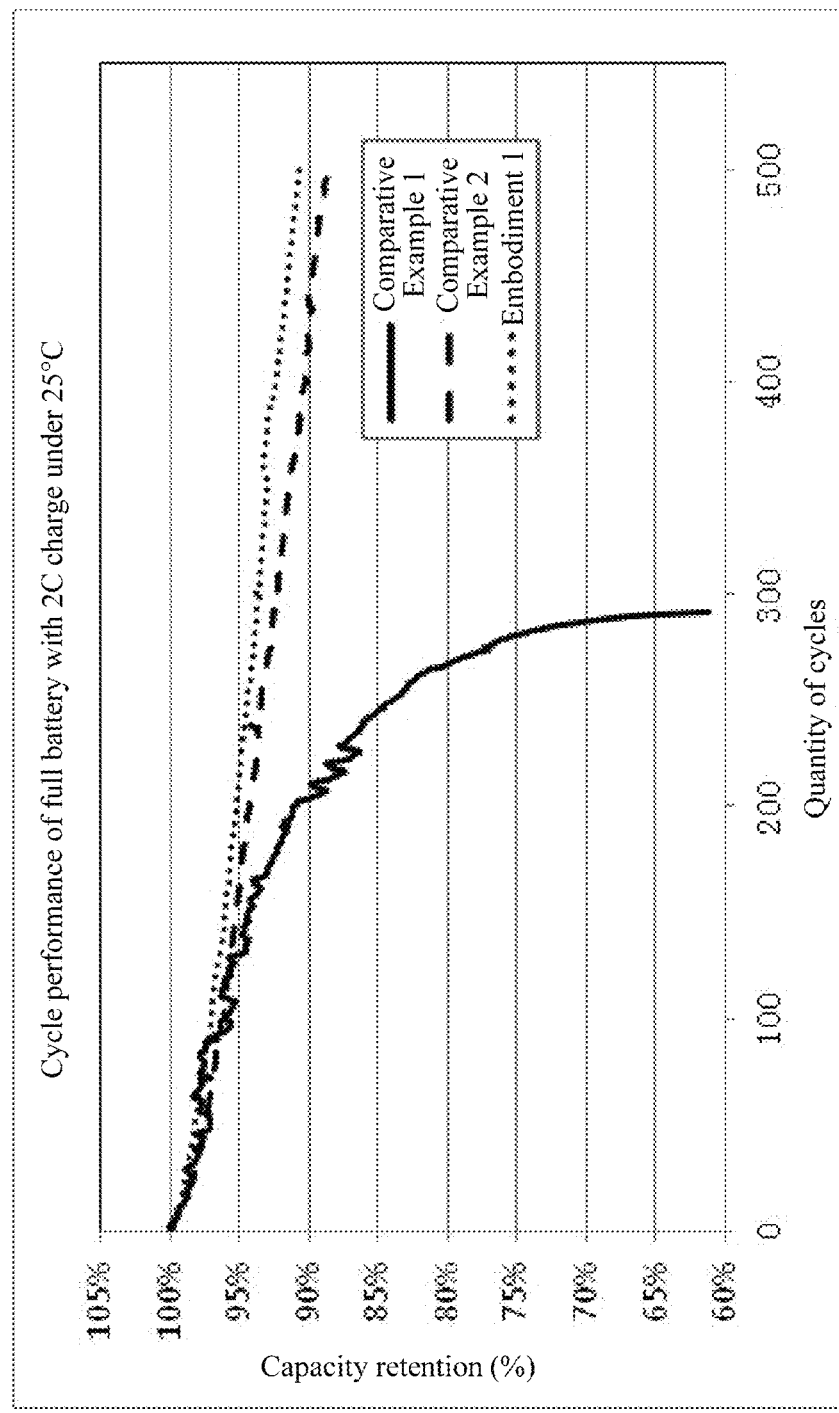
FIG. 7 is a comparison diagram of cycle performance of negative electrode materials in a full battery with 2 C fast charge at room temperature according to Embodiment 1, Comparative Example 1, and Comparative Example 2 of the present application.

FIG. 7 is a comparison diagram of cycle performance of negative electrode materials in a full battery with 2 C fast charge at room temperature according to Embodiment 1, Comparative Example 1, and Comparative Example 2 of the present application. It can be learned from FIG. 7 that the battery with the completely uncoated graphite negative electrode in Comparative Example 1 basically has no 2 C charge cycle capability, and the capacity is reduced to 60% after fewer than 300 cycles. The graphite negative electrode in Embodiment 1 of the present application can completely implement a 2 C charge cycle, and more than 90% of the capacity can still be retained after 500 cycles. Therefore, the graphite negative electrode in Embodiment 1 has better capacity retention than that of the negative electrode in Comparative Example 2.

3. Cycle Performance Test for Fast Charge at a Low Temperature

Figure 8:
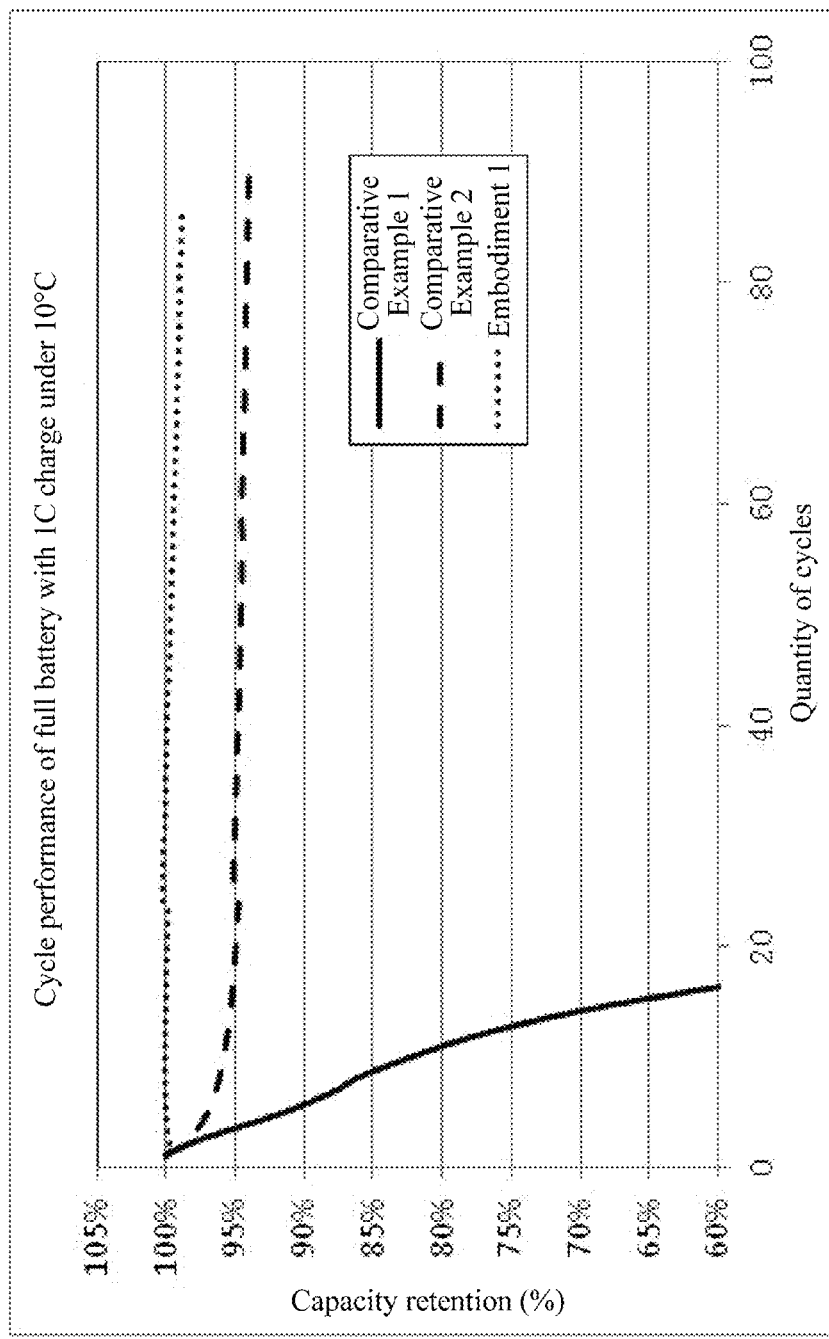
FIG. 8 is a comparison diagram of cycle performance of negative electrode materials in a full battery with 1 C fast charge at a low temperature of 10° C. according to Embodiment 1, Comparative Example 1, and Comparative Example 2 of the present application.

FIG. 8 is a comparison diagram of cycle performance of negative electrode materials in a full battery with 1 C fast charge at a low temperature of 10° C. according to Embodiment 1, Comparative Example 1, and Comparative Example 2 of the present application. It can be learned from FIG. 8 that the battery with the completely uncoated graphite negative electrode in Comparative Example 1 cannot implement a 1 C fast charge cycle at a low temperature of 10° C., and the capacity is reduced to approximately 60% after fewer than 20 cycles. Cycle performance with 1 C fast charge at a low temperature of 10° C. of the purely N-doped graphite negative electrode in Comparative Example 2 is also relatively poor, and the capacity of the graphite negative electrode is reduced to 95% after fewer than 20 cycles. The graphite negative electrode in Embodiment 1 of the present application has good cycle performance with 1 C fast charge at a low temperature of 10° C., and approximately 99% of the capacity of the graphite negative electrode can still be retained after 80 cycles.

Therefore, compared with a charge capability of a common negative electrode material with approximately 0.5 C at room temperature, the lithium-ion battery negative electrode active material provided in the embodiments of the present application can implement 2 C fast charge at room temperature, and more than 90% of the capacity can still be retained after 500 cycles. In addition, the low-temperature fast-charge performance of the lithium-ion battery negative electrode active material provided in the embodiments of the present application is apparently improved compared with that in Comparative Example 2.

What is claimed is:

1. A lithium-ion rechargeable battery negative electrode active material comprising:
   (1) a carbon core; and
   (2) a coating layer formed over a surface of the carbon core,
      wherein the coating layer is of a double-layer structure comprises a doped layer and an amorphous carbon layer, the coating layer formed on the surface of the carbon core,
      wherein the doped layer comprises amorphous carbon and a doping element,
      wherein the doping element comprises nitrogen,
      wherein the doping element further comprises any one or a mixture of phosphorus, sulfur, oxygen, and chlorine, and
      wherein the amorphous carbon layer is the outermost layer, of the double-layer structure.

2. The lithium-ion rechargeable battery negative electrode active material according to claim 1, wherein a mass content of the doped layer in the entire negative electrode active material is 0.1% to 30%, and a mass content of the a doping element in the doped layer is 0.1% to 30%.

3. The lithium-ion rechargeable battery negative electrode active material according to claim 1, wherein a mass content of the coating layer in the entire negative electrode active material is 0.1% to 30%, and a mass content of the doping element in the coating layer is 0.1% to 20%.

4. The lithium-ion rechargeable battery negative electrode active material according to claim 1, wherein a thickness of the doping layer is 0.1 μm to 10 μm.

5. The lithium-ion rechargeable battery negative electrode active material according to claim 1, wherein the doping element further comprises.

6. The lithium-ion rechargeable battery negative electrode active material according to claim 1, wherein a material of the carbon core comprises at least one of natural graphite, artificial graphite, expanded graphite, graphite oxide, hard carbon, soft carbon, graphene, carbon nanotube, or carbon fiber.

7. A lithium-ion rechargeable battery negative electrode plate comprising:
   (a) a current collector and (b) a lithium-ion rechargeable battery negative electrode active material that is coated on the current collector, wherein the lithium-ion rechargeable battery negative electrode active material comprises:
   (1) a carbon core; and
   (2) a coating layer formed over a surface of the carbon core,
      wherein the coating layer is of a double-layer structure comprising comprises a doped layer and an amorphous carbon layer, the coating layer formed on the surface of the carbon core,
      wherein the doped layer comprises amorphous carbon and a doping element,
      wherein the doping element comprises nitrogen,
      wherein the doping element further comprises any one or a mixture of phosphorus, sulfur, oxygen, and chlorine, and
      wherein the amorphous carbon layer is the outermost layer of the double-layer structure.

8. A lithium-ion rechargeable battery comprising:
   (a) a lithium-ion rechargeable battery negative electrode plate, (b) a positive electrode plate, (c) a separator, (d) a non-aqueous electrolyte, and (e) an enclosure, wherein the lithium-ion rechargeable battery negative electrode plate comprises (i) a current collector and (ii) a lithium-ion rechargeable battery negative electrode active material that is coated on the current collector, wherein the lithium-ion rechargeable battery negative electrode active material comprises:
   (1) a carbon core; and
   (2) a coating layer formed over a surface of the carbon core,
      wherein the coating layer is of a double-layer structure comprising comprises a doped layer and an amorphous carbon layer, the coating layer formed on the surface of the carbon core,
      wherein the doped layer comprises amorphous carbon and a doping element,
      wherein the doping element comprises nitrogen,
      wherein the doping element further comprises any one or a mixture of phosphorus, sulfur, oxygen, and chlorine, and wherein the amorphous carbon layer is the outermost layer of the double-layer structure.

9. The lithium-ion rechargeable battery negative electrode plate according to claim 7, wherein a mass content of the doped layer in the entire negative electrode active material is 0.1% to 30%, and a mass content of the doping element in the doped layer is 0.1% to 30%.

10. The lithium-ion rechargeable battery negative electrode plate according to claim 7, wherein a mass content of the coating layer in the entire negative electrode active material is 0.1% to 30%, and a mass content of the doping element in the coating layer is 0.1% to 20%.

11. The lithium-ion rechargeable battery negative electrode plate according to claim 7, wherein a thickness of the doping layer is 0.1 µm to 10 µm.

12. The lithium-ion rechargeable battery according to claim 8, wherein a mass content of the doped layer in the entire negative electrode active material is 0.1% to 30%, and a mass content of the doping element in the doped layer is 0.1% to 30%.

13. The lithium-ion rechargeable battery according to claim 8, wherein a mass content of the coating layer in the entire negative electrode active material is 0.1% to 30%, and a mass content of the doping element in the coating layer is 0.1% to 20%.

14. The lithium-ion rechargeable battery according to claim 8, wherein a thickness of the doping layer is 0.1 µm to 10 µm.

15. The lithium-ion rechargeable battery negative electrode active material according to claim 1, wherein the doping layer comprises element carbon provided by pyrrole or pyridine.

16. The lithium-ion rechargeable battery negative electrode active material according to claim 1, wherein a thickness of the amorphous carbon layer is 3 µm to 8 µm.

17. The lithium-ion rechargeable battery negative electrode active material according to claim 1, wherein a mass content of the amorphous carbon in the entire negative electrode active material is 0.1% to 30%.

18. The lithium-ion rechargeable battery negative electrode plate according to claim 7, wherein the doping layer comprises element carbon provided by pyrrole or pyridine.

19. The lithium-ion rechargeable battery according to claim 8, wherein the doping layer comprises element carbon provided by pyrrole or pyridine.

20. The lithium-ion rechargeable battery according to claim 8, wherein a thickness of the amorphous carbon layer is 3 µm to 8 µm.

* * * * *